(12) United States Patent
Rosser et al.

(10) Patent No.: US 8,849,101 B2
(45) Date of Patent: Sep. 30, 2014

(54) PROVIDING PREVIEWS OF SEEK LOCATIONS IN MEDIA CONTENT

(75) Inventors: Peter Rosser, Kirkland, WA (US); C. Wesley Wahlin, Issaquah, WA (US); Jennifer Roth, Seattle, WA (US); Timothy Zobel, Snoqulamie, WA (US)

(73) Assignee: Microsoft Corporation, Redmond, WA (US)

(*) Notice: Subject to any disclaimer, the term of this patent is extended or adjusted under 35 U.S.C. 154(b) by 947 days.

(21) Appl. No.: 12/411,906

(22) Filed: Mar. 26, 2009

(65) Prior Publication Data

US 2010/0251121 A1 Sep. 30, 2010

(51) Int. Cl.
| | |
|---|---|
| G06F 3/01 | (2006.01) |
| H04N 21/81 | (2011.01) |
| G11B 27/34 | (2006.01) |
| H04N 21/431 | (2011.01) |
| H04N 21/422 | (2011.01) |
| G11B 27/00 | (2006.01) |
| H04N 21/472 | (2011.01) |
| G11B 27/10 | (2006.01) |

(52) U.S. Cl.
CPC .......... *G11B 27/105* (2013.01); *H04N 21/8146* (2013.01); *G11B 27/34* (2013.01); *H04N 21/4316* (2013.01); *H04N 21/42215* (2013.01); *G11B 27/005* (2013.01); *H04N 21/47217* (2013.01)
USPC .......................................... 386/350; 386/343

(58) Field of Classification Search
CPC .................... H04N 21/47217; H04N 21/4316; G11B 27/005
See application file for complete search history.

(56) References Cited

U.S. PATENT DOCUMENTS

| 6,018,337 A * | 1/2000 | Peters et al. .................. 715/723 |
| 6,154,771 A | 11/2000 | Rangan et al. |
| 6,721,490 B1 * | 4/2004 | Yao et al. ...................... 386/351 |
| 7,248,786 B2 * | 7/2007 | Kato et al. ..................... 386/241 |
| 2002/0075572 A1 * | 6/2002 | Boreczky et al. ............. 359/722 |
| 2004/0189691 A1 * | 9/2004 | Jojic et al. ..................... 345/720 |
| 2005/0071782 A1 * | 3/2005 | Barrett et al. ................. 715/838 |

(Continued)

FOREIGN PATENT DOCUMENTS

| CN | 1922690 A | 2/2007 |
| CN | 101395592 A | 3/2009 |

(Continued)

OTHER PUBLICATIONS

Krikorian, Raffi, "TiVo remote with the most control", Dec. 9, 2004, 4 pages, Downloaded from the wayback machine on Jun. 12, 2012.*

(Continued)

*Primary Examiner* — Matthew Henning
(74) *Attorney, Agent, or Firm* — Micah Goldsmith; Leonard Smith; Micky Minhas

(57) ABSTRACT

Providing previews of seek locations in digital media is disclosed. While playback of the media content is progressing as normal a snapshot such as a thumbnail is displayed to show the user a representation of the media content that is associated with a seek location. The functionality of a transport key may be temporarily modified. The temporary modification allows the user to seek to a desired location very accurately and may result in fewer input keys being selected. Moreover, because the modification is temporary a great deal of flexibility is provided.

11 Claims, 10 Drawing Sheets

(56) References Cited

U.S. PATENT DOCUMENTS

| | | | |
|---|---|---|---|
| 2005/0185921 A1 | | 8/2005 | Skran et al. |
| 2005/0216752 A1 | | 9/2005 | Hofmeyr et al. |
| 2006/0080716 A1 | * | 4/2006 | Nishikawa et al. ............. 725/89 |
| 2007/0016611 A1 | | 1/2007 | Wang |
| 2007/0113182 A1 | | 5/2007 | Hollemans |
| 2007/0223878 A1 | | 9/2007 | Abe et al. |
| 2008/0005128 A1 | | 1/2008 | Jayaraman et al. |
| 2008/0107402 A1 | | 5/2008 | Angiolillo et al. |
| 2009/0063981 A1 | * | 3/2009 | Kikuchi et al. ............... 715/723 |
| 2009/0195355 A1 | * | 8/2009 | Mitchell ........................ 340/5.8 |

FOREIGN PATENT DOCUMENTS

| | | | |
|---|---|---|---|
| EP | 1624680 A2 | * | 2/2006 |
| EP | 1631083 A1 | | 3/2006 |
| WO | 2007103700 A2 | | 9/2007 |
| WO | 2007117613 A2 | | 10/2007 |
| WO | 2008083867 A1 | | 7/2008 |

OTHER PUBLICATIONS

TMPGEnc DVD Author, website, 15 pages, http://www.doom9.org/index.html?/mpg/tmpg-dvdauthor.htm.

Jason Snell, First Look: Netflix Instant Watching for Intel Macs, macworld.com, website, 4 pages, http://www.macworld.com/article/136431/netflix.html.

DVStor Call Centre Application (CCA), Sensor, News From Pixelmextrix, Apr.-May 2006, Issue 47, 7 pages, http://www.pixelmetrix.com/PressCenter/cust.sensor/Sensor%20C.47%20Apr-May%2006.pdf.

Delivering a Reliable Video Experience, pp. 292-398, http://www.adobe.com/devnet/flash/articles/flash_cs3_video_techniques_ch12.pdf.

Klaus Langer, TV Playback and Recording, Tom's Guide US, Jun. 14, 2005, website, 3 pages, http://www.tomsguide.com/us/windows-in-the-living-room,review-477-7.html.

Canon Powershot Pro90IS, Steve's Digicams, website, http://www.steves-digicams.com/pro90is_pg5.html.

David Nelson, Using Enhanced Trick Mode, Microsoft Corporation, Sep. 2007, 3 pages, http://www.microsoft.com/windows/windowsmedia/howto/articles/trickmode.aspx.

Generate Thumbnails from Video Playing in WMP11?, Copyright 2000-2009 eggheadcafe.com, website, http://www.eggheadcafe.com/software/aspnet/31263321/generate-thumbnails-from.aspx.

Chinese Office Action dated Jul. 10, 2012, Chinese Patent Application No. 201080014021.9, filed Mar. 2, 2010, 15 pages.

Response to Chinese Office Action dated Nov. 22, 2012, Chinese Patent Application No. 201080014021.9, filed Mar. 2, 2010, 36 pages.

Extended European Search Report dated Jan. 21, 2013, European Patent Application No. 10756553.3 filed Mar. 2, 2010, 13 pages.

* cited by examiner

PROVIDING PREVIEWS OF SEEK LOCATIONS IN MEDIA CONTENT

BACKGROUND

Numerous techniques have been developed for controlling playback of media content such as live or recorded television, digital versatile disks (DVDs), etc. However, many existing techniques have one or more shortcomings. For example, by using various "transport keys" (also referred to as "trick play" keys) on a remote control a user can seek to another location in media content. As particular examples, a user can fast forward to seek another location in recorded TV or rewind to go back to a previous location in live TV if the live TV signal is buffered. Another technique is to allow the user to skip ahead a pre-determined amount of time each time the user presses a "skip" button. However, this is a guessing game of trial and error and results in many button presses. For example, if a user is watching a recorded TV show when commercials start the user presses skip one or more time to attempt to skip the commercials. However, once all of the commercials have been skipped, the user will usually need to press replay to move back to be sure that no portion of the TV show was skipped.

SUMMARY

Techniques are disclosed herein for controlling media playback. In one aspect, while playback of the media content is progressing as normal, a snapshot such as a thumbnail is displayed to show the user a representation of the media content that is associated with a seek location. Thus, the user is allowed to preview the content at the seek location while still watching the normal playback. In another aspect, the functionality of a transport key is temporarily modified. The temporary modification allows the user to seek to a desired location very accurately and may result in fewer input keys being selected. Moreover, because the modification is temporary, a great deal of flexibility is provided.

In one aspect, while digital content is presented on a display screen of an electronic device, a request is received through a user interface to seek to one or more other locations in the digital content. One or more representations associated with the one or more other locations in the digital content are provided while continuing to present the digital content.

In one aspect, while video is presented on a display screen of an electronic device, a numeric value and a selection of a transport key are received through a user interface. The functionality of the transport key is temporarily modified based on the numeric value. The video is presented on the display screen based on the temporary modification of the functionality of the transport key.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
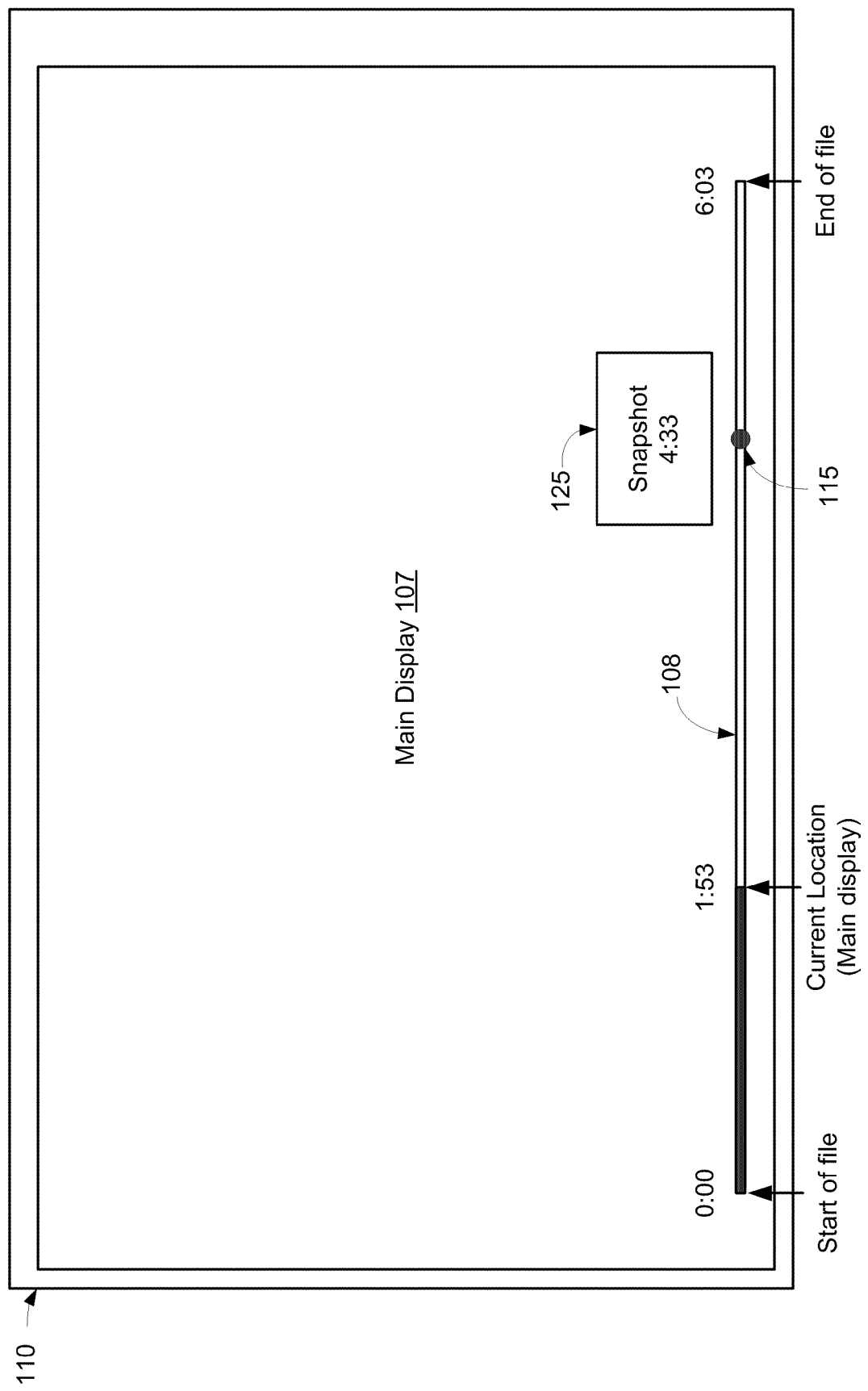
FIG. 1A illustrates one embodiment of displaying recorded video content along with a snapshot representing video at a location to which a user is seeking.

FIG. 1A illustrates one embodiment of displaying recorded video content in a main display 107 along with a snapshot 125 that represents video at another location in recorded file. The snapshot 125 changes as the user seeks to a new location in the recorded file. The timeline 108 indicates that the recording is 6 hours and 3 minutes long. The majority of the display screen 110 plays the recorded video content at a normal playback speed. Audio content associated with the video may also be played in synchronization with the video signal. The timeline 108 indicates that the current location being presented in the main display 107 is 1 hour and 53 minutes into the recording.

The user is allowed to move a shuttle 115 along the timeline 108 to seek to a new location in the recorded video. The snapshot 125 is a representation of the video content at the shuttle's location. As an example, the snapshot 125 may be a "thumbnail," which is a significantly reduced size image (as compared to the main display 107) corresponding to the video at 4 hours and 33 minutes. One technique for generating thumbnails of videos is described in U.S. Published Patent Application 2008/0192840, published on Aug. 14, 2008, entitled "Smart Video Thumbnail," which is hereby incorporated herein by reference in its entirety for all purposes. However, the snapshot 125 is not limited to being a thumbnail. The snapshot 125 may be a static image (e.g., still frame) or may comprise multiple frames even if the shuttle 115 is stationary. The snapshot 125 is not required to be an image. More generally, the snapshot 125 may be any representation that is associated with the shuttle location. The snapshot 125 could be non-image data such as a title, scene description, etc.

As the user slides the shuttle 115 along the timeline 108, a series of snapshots 125 may be displayed. In one aspect, after the user stops moving the shuttle 115 there is a brief settling period after which the content of the main display 107 switches to show the video corresponding to the location associated with the shuttle 115. In other words, the content that was in the snapshot 125 is moved to the main display 107. Then, the snapshot 125 may be removed from the display. Therefore, the user is allowed to seek to a new location and preview the content there prior to switching the main display 107 to the new location. If the user decides not to switch to the new location, the user is allowed to abort the operation. Note that the main display 107 continues to present the audio/visual signal at the current location such that viewing (and listening) is not interrupted during the seek process.

Figure 1B:
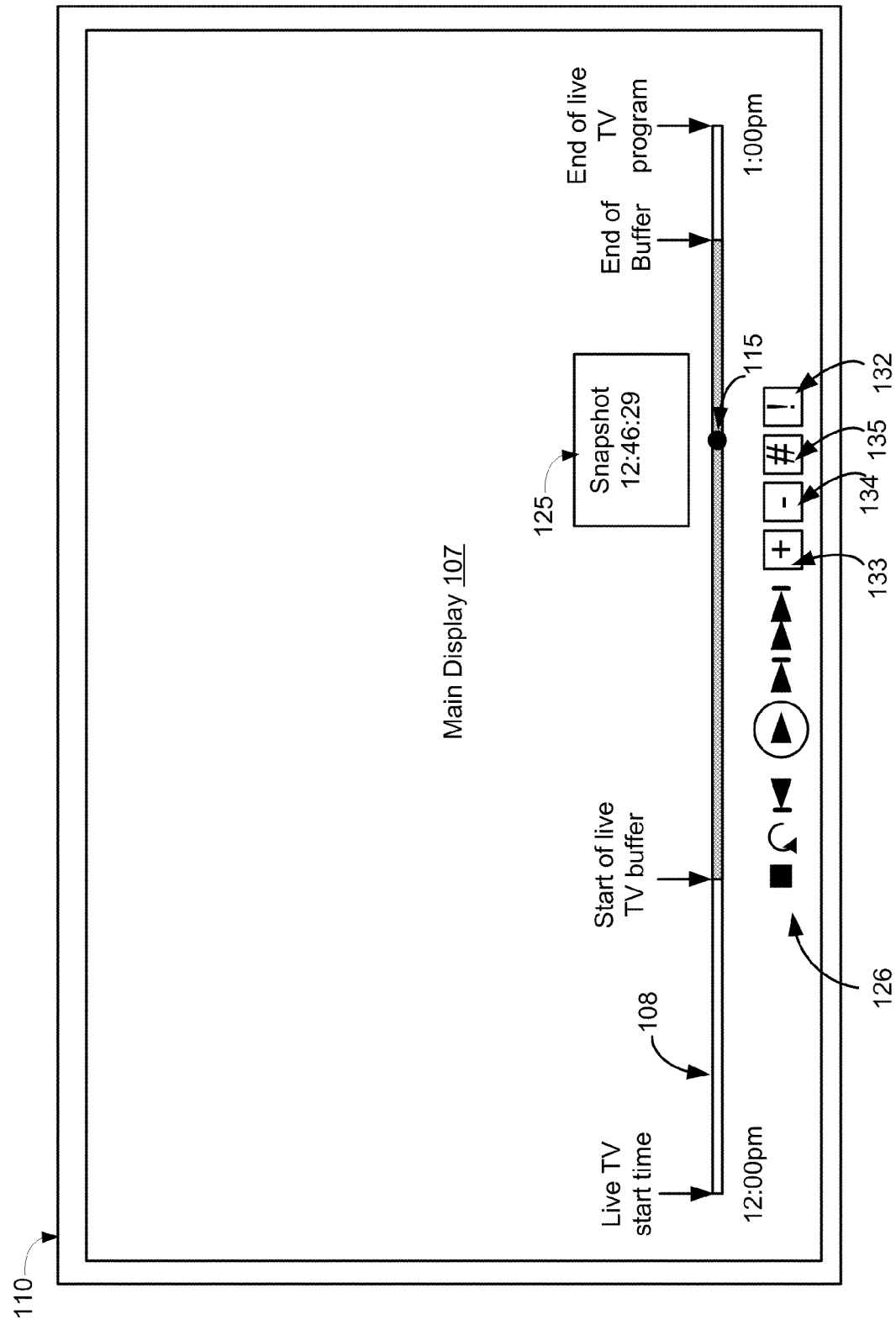
FIG. 1B illustrates one embodiment of displaying live video content along with a snapshot representing video at a location to which a user is seeking.

FIG. 1B illustrates one embodiment of displaying live video content along with a snapshot 125 representing video at a location to which a user is seeking. In this embodiment, the timeline 108 indicates the start time and end time of the live TV program. Moreover, the timeline 108 depicts the time range for which a buffered version of the live TV signal is available (as indicated by "start of live TV buffer" and "end of buffer"). In this example, the user has moved the shuttle 115 to the time 12:46:29. The snapshot 125 depicts a representation of the live TV signal for that point in time. The snapshot 125 could be a still frame or a series of frames, or non-image data. The main display 107 may be playing any portion of the live TV buffer.

Operation of the shuttle 115 may be similar to the example of FIG. 1A in that as the user slides the shuttle 115 along the timeline 108, a series of snapshots 125 are displayed. In one aspect, after the user stops moving the shuttle 115 there is a brief settling period after which the content of the main display 107 switches to play the video at the location associated with the shuttle 115. Therefore, the user is allowed to seek to a new location and preview the content there prior to switching to the new location. If the user decides not to switch to the new location, the user is allowed to abort the operation. Note that the main display 107 continues to present live (or buffered) TV such that viewing (and listening) is not interrupted during the seek process.

FIG. 1B also shows control keys 126 that the user can select with a mouse or other device to control the video content. Keys 126 include (in order from left to right) a stop key, a replay key, a rewind key, a play key, and two fast forward keys (moderate speed and high speed). In one embodiment, keys 126 can be used to control the main display 107 or the shuttle 115. For example, the user may opt to simply rewind what is being shown in the main display 107 without a snapshot 125 being displayed. In this case, instead of the main display 107 presenting the video signal at normal speed, the main display 107 presents according to the selection of keys 126.

In one embodiment, a snapshot button 132 is provided for the user to select to request snapshots 125. When the user selects snapshot button 132 followed by one of the keys 126 within a timeout period, the keys 126 control the position of the shuttle 115. The fine tuning buttons 133 and 134 are used to nudge the location in the video associated with the snapshot 125 forward and backward during the settling time after the user is no longer selecting one of the keys 126. If the user selects the select button 135, then the location of the video content that is associated with the shuttle 115 (or the snapshot 125) is presented in the main display 107 at normal speed. An audio signal may be synchronized with the playing the video in the main display 107.

The display in FIGS. 1A and/or 1B may be part of an electronic device such as a computer system, a television, a cellular telephone, a personal digital assistant (PDA), a personal navigation device, a video game console, etc. The display may be integrated in the electronic device or separate from the electronic device. Note that in some embodiments the snapshot 125 may occupy a large portion of the display screen 110. For example, in embodiments in which the snapshot 125 is presented on a separate display screen, the snapshot 125 might occupy the entire display screen.

Figure 2:
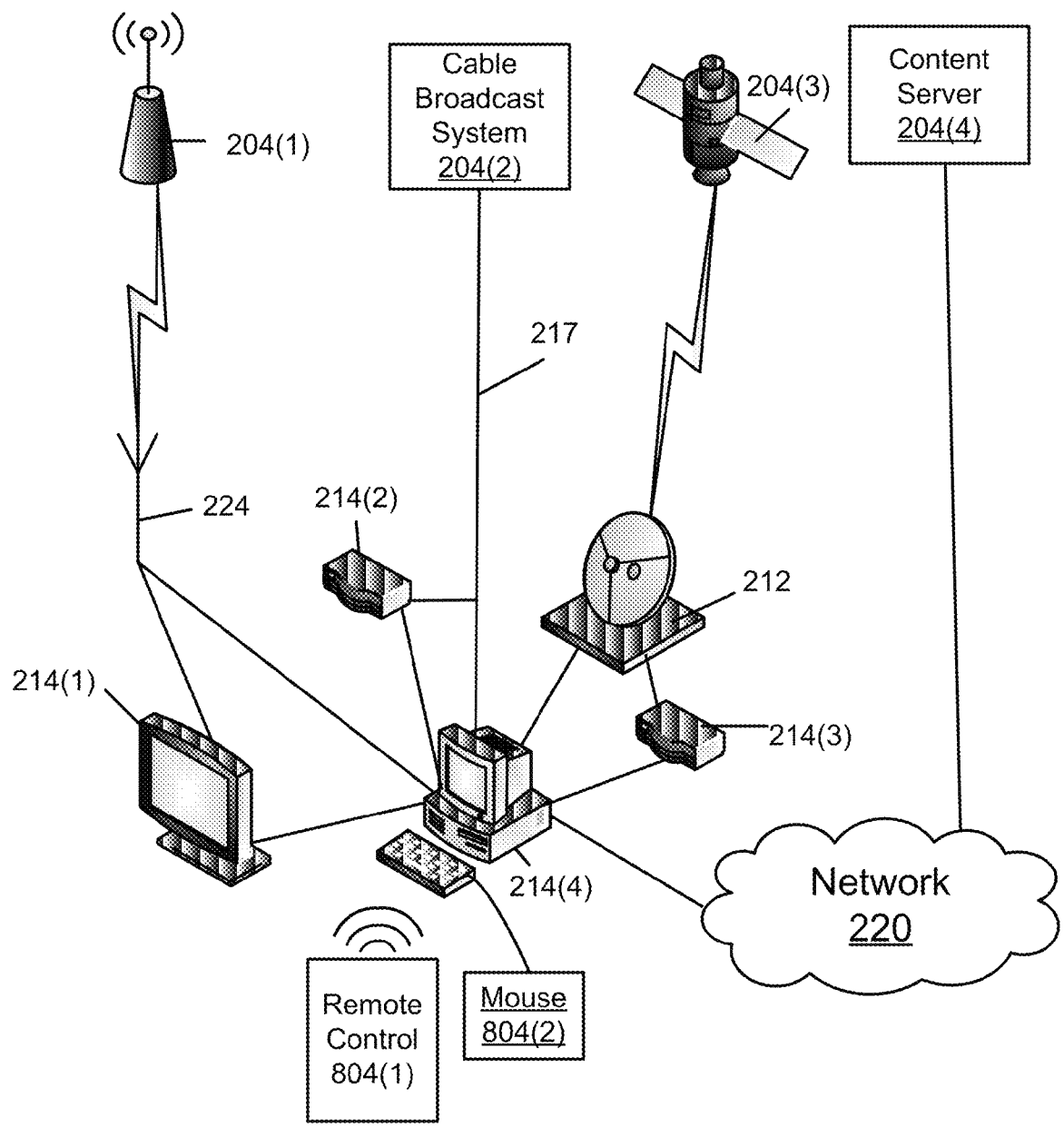
FIG. 2 illustrates an exemplary entertainment system in which various embodiments described herein can be implemented.

FIG. 2 illustrates an exemplary entertainment system 200 in which various embodiments described herein can be implemented. System 200 includes multiple electronic devices 214(1)-214(4) connected to program sources 204(1)-202(4). A program source 204 refers to the source of a particular signal that is received by an electronic device 214. Sources 204 can include, without limitation, a local television antenna 204(1), a cable broadcast system 204(2), a satellite 204(3), a content server 204(4) etc.

The local television antenna 204(1) may be used to transmit a signal from a local television (or radio) station. The cable broadcast system 204(2) provides content from a cable television provider. The satellite 204(3) provides a signal for a satellite television provider. The content server 204(4) provides a signal from an Internet television provider. FIG. 2 presents only a few example program sources 204. The signals transmitted by the program sources 204 have embedded therein content such as television programs, movies, commercials, music, and similar audio and/or video content. Thus, the signals from the program sources 204 are not limited to television.

Electronic devices 214 can be implemented in a number of ways. For example, electronic device 214(1) is connected to an antenna 224 to receive program content from a local television station. In this example, electronic device 214(1) is a television set, which can receive content from other electronic devices 214(2)-214(4). Electronic device 214(1) may have a direct connection to electronic devices 214(2) and 214(3) to receive the program content; however, those connections have not been depicted in FIG. 2 so as to not obscure the diagram. In one embodiment, the system 200 includes a television set that does not have a tuner.

Electronic device 214(2) is connected to a cable network 217 to receive program content from a cable system 204(2). Electronic device 214(2) is also referred to as a set-top box. Electronic device 214(3) is coupled to a satellite dish 212 to receive program content from the satellite 204(3). Electronic device 214(3) may also be referred to as a set-top box or a satellite-receiving device. Electronic device 214(4) is connected to a network 220 (e.g., the Internet) to receive program content from the content server 204(4). The electronic device 214(4) can also receive program content from a network source that is not on the Internet. Electronic device 214(4) may also be referred to as a personal computer. The electronic devices 214(1)-214(4) have at least one tuner to tune to signals to extract the content.

In one embodiment, the personal computer 214(4) is able to play and record the program content. By the personal computer 214(4) recording content on-the-fly, a user can pause and rewind live television being played on the personal computer 214(4). The personal computer 214(4) can receive the program content in a variety of ways. In one embodiment, the personal computer 214(4) has a tuner card to allow the personal computer 214(4) to directly receive the program content. The tuner card may be installed inside the computer 214(4) by connecting the tuner card to, for example, a peripheral component interface (PCI) expansion slot. Alternatively, the tuner card can be external hardware that is connected to the computer 214(4) by a Universal Serial Bus (USB) cable or the like. A tuner card can be connected to the antenna 224, cable connection 217, and satellite dish 212, as examples.

A tuner card can include, but is not limited to, a single tuner that receives analog broadcast signals, a single tuner for digital signals, a hybrid tuner that can be re-configured to receive either analog or digital signals, and a combination tuner that comprises both an analog tuner and a digital tuner. Note that a hybrid tuner functions as either an analog tuner or a digital tuner at one point in time. However, the hybrid tuner can be reconfigured to operate as the other type of tuner. Because a combination tuner has an analog and a digital tuner, a user can watch an analog broadcast while recording a digital broadcast, or vice versa. Some tuner cards have two (or more) digital tuners and/or two (or more) analog tuners.

However, the computer 214(4) (or other electronic device 214) does not require special hardware such as a tuner card to receive the program content from the content server 204(4). Herein, a tuner includes, but is not limited to, any combination of software and hardware that allows an electronic device 214 to receive different network 220 based stations (e.g., television or radio stations). Such a tuner may also be referred to herein as a "virtual tuner." An example of a network 220 based station is a broadcast network such as the American Broadcasting Corporation (ABC) streaming "Internet Television" from a web site. Numerous vendors provide software programs for receiving Internet Television. An example of such a software product is the Microsoft® Mediaroom™ Internet Protocol Television (IPTV) software platform, which is commercially available from Microsoft Corporation of Redmond, Wash.

Note that the personal computer 214(4) can also be connected to other electronic devices 214(1)-214(3) to allow the personal computer 214(4) to receive program content from the tuners in the other devices 214(1)-214(3). For example, the personal computer 214(4) can be connected to either of the set top boxes 214(2), 214(3) to receive an output single therefrom. The personal computer 214(4) executes software to process the signals output from electronic devices 214(2) or 214(3) to play television programs, etc. on the personal computer 214(4). An example of such software is the Media Center™ entertainment center, which is commercially available from Microsoft Corporation of Redmond, Wash. Such software can also be used to play television content based on the output of the computer's tuner card. Thus, the personal computer 214(4) can receive and play program content from any of the sources 204(1)-204(4) through a tuner whether the tuner is hardware, software, or some combination of hardware and software.

An electronic device 214 may have a user interface that allows the user to control media playback. In some embodiments, a "remote control" device 804(1) may be used to control the shuttle 115 and/or the main display 107. Remote controls are commonly used to control electronic devices such as televisions, set top boxes, video recorders, and DVD players. Such remote controls normally have keys corresponding to keys 126. However, a conventional remote control may not have keys that are normally used in a manner of buttons 132-135. The remote control 804(1) could be programmed to specifically implement buttons 132-135. For example, the code that the remote control 804(1) outputs in response to user selection of certain keys can be programmed to implement a code that gets interpreted by the electronic device 214 as buttons 132-135. However, special programming of the remote control 804(1) is not required. In one embodiment, one or more keys on the remote control 804(1) that are normally used for other functions may be used to implement buttons 132-135. In this case software (or other logic) in the electronic device 214 interprets the code for these keys as a selection of one of buttons 132-135 instead of the normal function associated with those keys on the remote control 804(1). In some embodiments, a "mouse" device 804(2) may be used to control the shuttle 115 and/or the main display 107.

One or more electronic 214 devices in the system 200 have logic embedded therein for controlling the playback of media content as described herein. In one embodiment, the logic for controlling the playback is implemented with software. However, the logic for controlling the playback could be implemented with a combination of hardware and software. In one embodiment, the personal computer 214(4) controls the playback. However, another electronic device may control the playback or controlling the playback can be shared by multiple devices.

It is to be appreciated and understood that the exemplary system 200 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Figure 3:
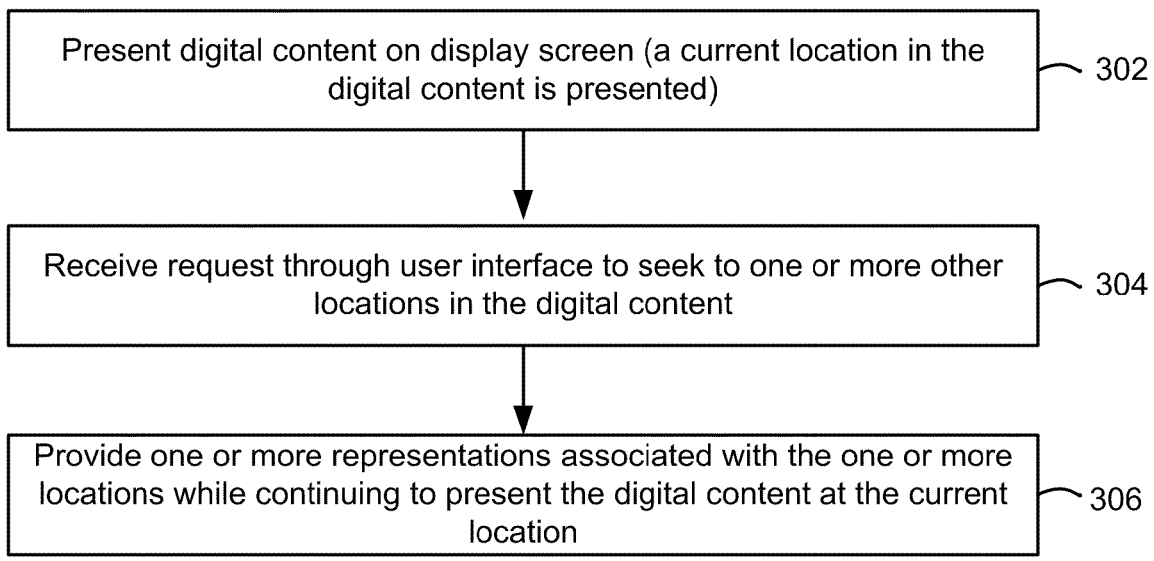
FIG. 3 is a flowchart of steps of one embodiment of a process of presenting digital content along with a representation associated with a different location in the digital content.

FIG. 3 is a flowchart of steps of one embodiment of a process 300 of presenting digital content associated with a current location in the digital content along with a representation associated with a different location in the digital content. Steps of process 300 may be implemented as instructions stored on a computer readable storage medium, which when executed on a processor, cause the processer to perform the steps of process 300. It will be understood that when presenting digital content associated with a current location that the current location may continuously be updated. For example, when playing video at a normal speed the current location may be a time index of the digital content that is currently being displayed.

Figure 5:
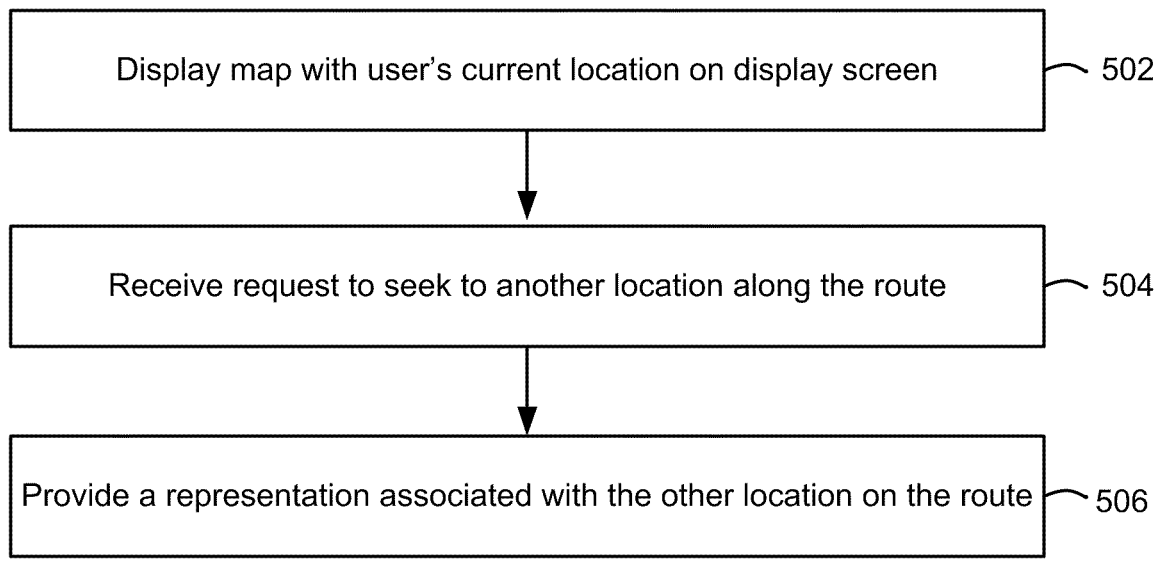
FIG. 5 is a flowchart of steps of one embodiment of a process of presenting a map route on a display while allowing a user to seek to another location on the map route.

In step 302, the digital content is presented on a display screen. Playing live or recorded video at normal playing speed are two examples; however, process 300 is not so limited. In one implementation, process 300 is performed within a navigation device that is global position satellite (GPS) enabled. Thus, the digital content could include digitally stored map data and associated content (e.g., street level views and restaurant data). Process 500 of FIG. 5 depicts further details in which process 300 is performed in a navigation device.

In step 304, a request is received through a user interface to seek to one or more other locations ("seek locations") in the digital content. Using the examples in FIGS. 1A and 1B, to seek, the user causes the shuttle 115 to move using an input device such as a remote control 804(1) or mouse 804(2). In some embodiments, the user selects a "transport key" or a "trick play key" using remote control 804(1). Examples of such keys include, but are not limited to, fast forward, rewind, skip, and replay. The user could also move the shuttle 115 with a device such as a "mouse" 804 (2) that is commonly used to interface with computer systems. The mouse 804(2) could be used to "drag" the shuttle 115. Alternatively, the display screen 110 could have keys 126 and other buttons 132-135 that can be selected with a mouse 804(2) or otherwise.

In step 306, one or more representations associated with the seek locations are provided while continuing to present the digital content at the current location at normal speed. For example, as the user moves the shuttle 115, one or more snapshots 125 are presented while continuing to play video at normal speed in the main display 107.

Figure 4:
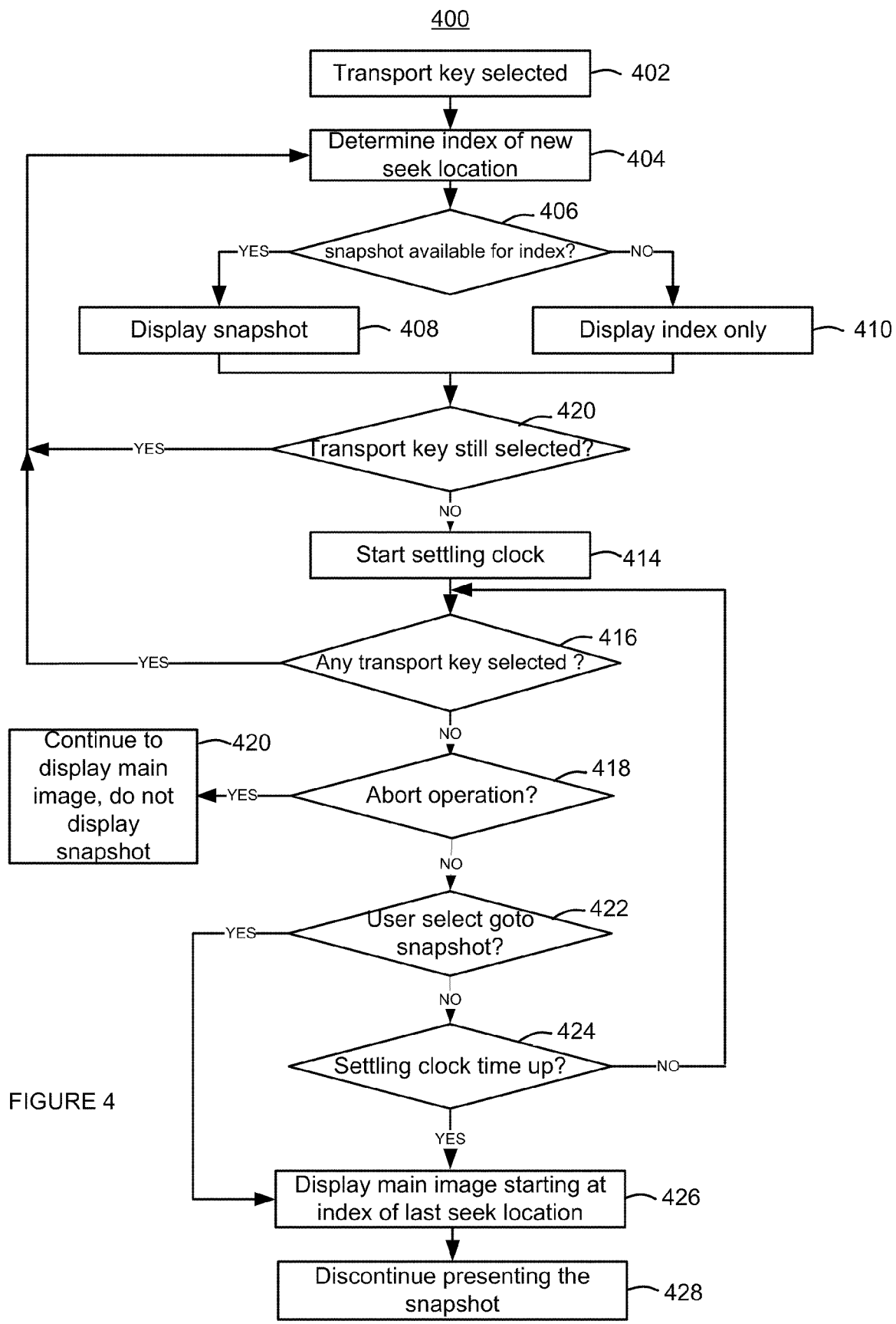
FIG. 4 is a flowchart of steps of one embodiment of a process of responding to a request to seek to another location in digital content.

FIG. 4 is a flowchart of steps of one embodiment of a process 400 of responding to a request to seek to another location in audio/video content. Process 400 may be implemented in an electronic device that is capable of playing live or recorded video. Prior to the start of process 400, a user takes action to cause the electronic device to play live or recorded audio/visual content (this corresponds to step 302 of process 300).

In step 402, a transport key is selected. Step 402 is one implementation of step 304 of process 300. The selection may be achieved by a user pressing a key on a remote control 804(1) or using a mouse 804(2) to select a key 126 that is displayed on a display screen. In some implementations, snapshots 125 are only provided if the user has expressly requested them. Thus, in some implementations a determination is made as to whether snapshots 125 have been requested. If not, then the selection is interpreted as a request to directly manipulate the content in the main display 107 without showing snapshots 125.

In step 404, an index for a new seek location is determined. An index is any information that can uniquely identify a location in the video content (recorded or buffered). For example, the index could be a time index, a frame index, etc. For example, as the user presses and holds the fast forward key an index is calculated as the current time index plus an amount of time that is a function of how rapidly the fast forward seeks through the video content.

In step 406, a determination is made as to whether a snapshot 125 exists or is readily available for the time index that was determined in step 404. For example, snapshots 125 could be stored for various time indexes, in which case the determination is to find a snapshot 125 close to the time index. Also, the snapshot 125 could possibly be generated "on-the-fly," in which case it is readily available. If a snapshot 125 exists or is readily available, then in step 408 the snapshot 125 is presented on the display 110 while continuing to present the video in the main display 107 at normal speed. The time index may be displayed with the snapshot 125. It is possible that a snapshot 125 is not currently available for the time index. If so, then the time index is displayed without a snapshot in step 410.

As long as the user continues to select the transport key additional snapshots 125 are generated. If the determination of step 412 indicates that the transport key is still selected, then control returns to step 404 to determine an index for a new seek position. Thus, process 400 includes a loop between steps 404-412 in which multiple snapshots 125 are provided while the user continues to select the transport key. As an example, so long as a user selects the fast forward key additional snapshots 125 will be periodically generated. A user may continue to select the fast forward key by continuing to press the fast forward key on the remote control 804(1) or by pressing the fast forward key one or more times to "lock in" the fast forward key. In such as case, discontinuing selection of the fast forward key may be achieved by selecting a stop key, a play key, re-pressing the fast forward key, or another technique. The selection and "de-selection" of the rewind key may be similar to the fast forward key.

Keys other than the fast forward and rewind keys may be treated as being capable of being continuously selected. For example, if the user continues to press the skip key it may be considered as a request to perform multiple skips. Each new request may be based on the user holding the skip key for a certain time (which may change as the user continues to hold the skip key). The amount of video that is skipped with each new request can be fixed or may be a function of the number of skip requests (or the length of time that the user has held the skip key). For example, initially the skips could be 30 seconds, but if the user continues to hold the skip key, then the amount of video that is skipped increases. It is not required that a transport key be capable of "continuous selection." For example, even if the user holds the replay key it might be interpreted as a single request.

When the user stops selecting the transport key, a setting clock in started (step 414). The settling clock is a timer that has an expiration time that is long enough to provide the user an opportunity to "fine tune" the seek location or abort the seek operation.

At any time during the settling period, the user may move the location of the snapshot 125. In step 416, a determination is made as to whether the user has selected a transport key or fine tuning key (e.g., 133, 134, FIG. 1B). If the user has selected such a key, then processing proceeds based on which key is selected. Control once again returns to step 404 to determine another index. If one of the fine tuning keys 133, 134 is selected, then snapshot 125 is nudged a small amount. That is, the seek location is moved a small amount. Step 404-416 are one implementation of step 306 of process 300. The remaining steps of process 400 do not correspond to explicit steps of process 300.

At any time during the settling period, the user may abort the seek operation. In step 418, a determination is made whether the user has selected to abort the seek operation. If the user decides to abort the seek operation, then the snapshot 125 is no longer displayed, but presentation of the content in the main display 107 is continued at normal speed (step 420). Any suitable key or other input may be used to indicate the abort request.

At any time during the settling period, the user may select to "go to" the snapshot (or seek) location. That is, the user can select to have main display 107 switch to the location associated with the snapshot 205. In step 422, a determination is made whether the user has selected to go to the snapshot location. If so, then the presentation of the main display 107 is switched to play at normal speed starting at the location associated with the snapshot 125 (step 426). Note that an audio signal may be played in synchronization with the video signal. In one implementation, the user requests to go to the snapshot location by selecting the play key; however, another input could be used. In step 428, the presentation of the snapshot 125 is discontinued.

If the settling time expires without user action (step 424), then it is assumed that the user desires to switch the main display 107 to the snapshot location. Thus, control passes to step 426 to switch the main display 107 to the snapshot location. However, other possibilities exist upon expiration of the timer in step 424. For example, rather than automatically switching the main display 107, the user could be prompted whether a switch is desired. As another alternative, the seek operation could be aborted as it was in step 420.

FIG. 5 depicts one embodiment of a process 500 of responding to a request to seek to another location on a map route. Process 500 may be performed in an electronic personal navigation device. The device may perform certain steps with the assistance of one or more other devices. An example implementation is for a user to request directions between two points. The navigation device either determines directions or obtains them from another device.

In step 502, a user's current location along a route is presented on a map on a display screen. Step 502 is one implementation of step 302 of process 300. In this case the digital content that is displayed could include the map, as well as providing step by step navigation directions. In this example, location in the digital content may be defined based on location. For example, the digital content could include a map route suggested by the navigation device. The map route can be thought of as a linear progression through the digital content. The progression may be defined in terms of distance along the route or time to travel the route (such an estimated or actual amount of time to travel the route). Thus, a position on the map route can be associated with a location in the digital content.

In step 504, a request is received to seek to another location along the map route. Step 504 is one implementation of step 304 of process 300. This seek could be a time based seek or a distance based seek. As an example, the user might be interested in restaurants that will be along the portion of the route that the user will be at in 1 hour. The user thus requests to seek forward 1 hour along the route. In response, the electronic devices 214 determine where the user will be along the route in 1 hour. In one embodiment, the user provides input that is used to determine a range of times. For example, the user could move a shuttle 115 along a timeline 108, or perhaps move a shuttle 115 along the map route. Thus, step 504 may include determining multiple locations ("seek locations").

In step 506, a representation associated with the one or more seek locations is provided while continuing to provide the map displayed in step 502. Step 506 is one implementation of step 306 of process 300. As an example, the representation could be a list of restaurants (possibly serving food in a certain price range, type, chain, etc.) that are near the seek location. As another example, the representation could be a street level view along the route.

Note that as the user continues to seek (step 504), the representation may change. For example, as the user seeks, the street level view or list of restaurants changes. Also note that the main display 107 may continue to show the map with step-by-step directions. As one working example, the driver can continue to receive directions (possibly audio prompts) while a passenger seeks out restaurants ahead on the route or studies a complex turn that is ahead.

Figure 6:
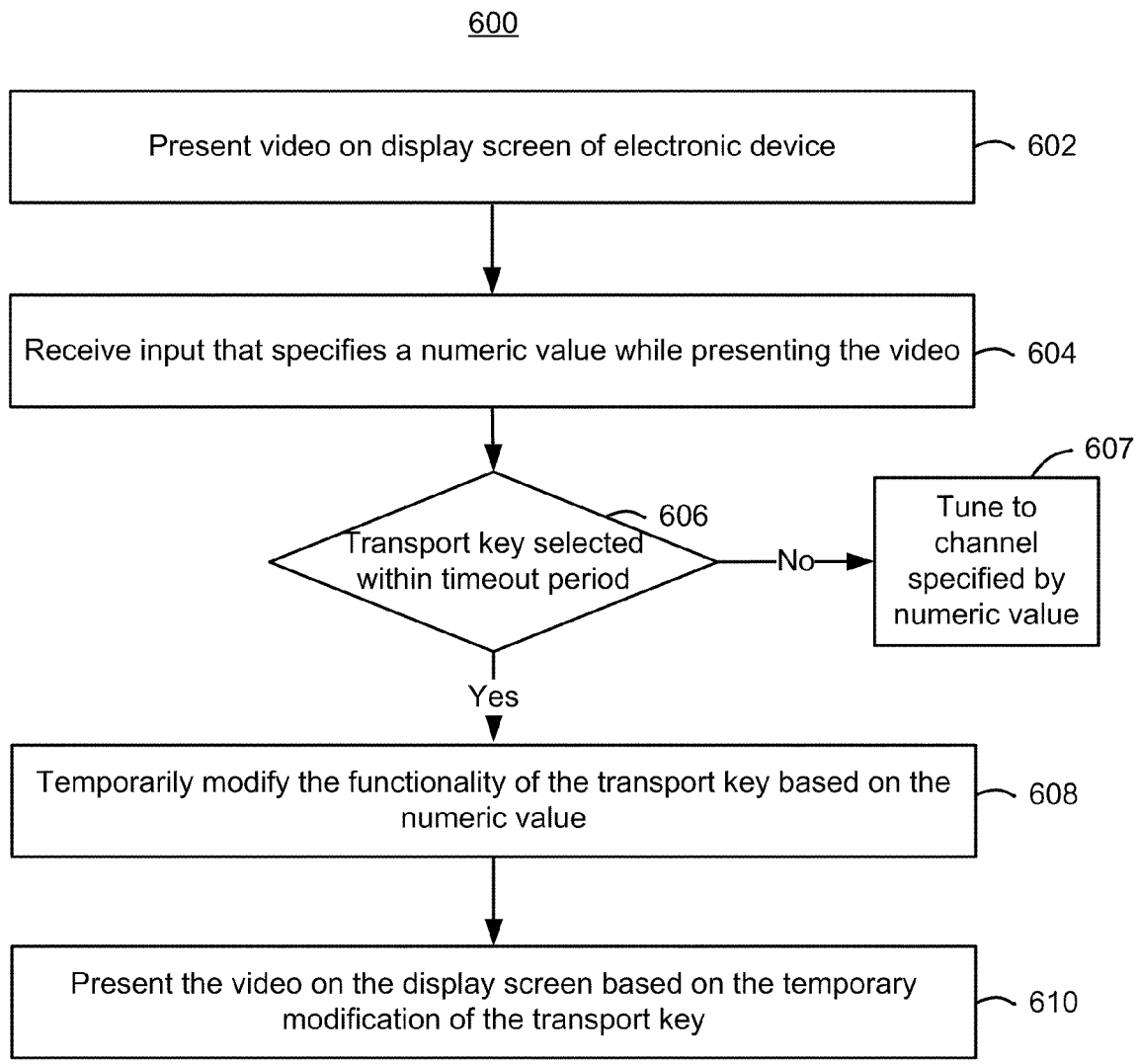
FIG. 6 is a flowchart of steps of one embodiment of a process of temporarily altering the functionality of a transport key.

FIG. 6 is a flowchart of steps of one embodiment of a process 600 of temporarily altering the functionality of a transport key. Process 600 may be performed by electronic device 214 such as a personal computer, television, set top box, cellular telephone, personal navigation device, etc. Process 600 may be used with a technique such as process 300 or process 400 that provide a user with a representation of a seek location (such as a snapshot 125). However, process 600 may be used without presenting snapshots 125. In step 602, video is presented on the display screen of the electronic device 214.

In step 604, user input that specifies a numeric value is received. For example, a user presses a number on a key pad of a remote control 804(1) and the remote control 804(1) sends a code to the electronic device 214.

In step 606, a determination is made whether a transport key is selected within a certain time of receiving the numeric value. For example, a user presses a transport key on a key pad of a remote control 804(1) and the remote control 804(1) sends a code to the electronic device 214. Examples of transport keys include, but are not limited to, replay, rewind, play, fast forward, and skip play.

If the transport key is not selected in the timeout period, then the numeric input is interpreted as a request to change channels (step 607). If a transport key is selected within the timeout period, then control passes to step 608.

Figure 7:
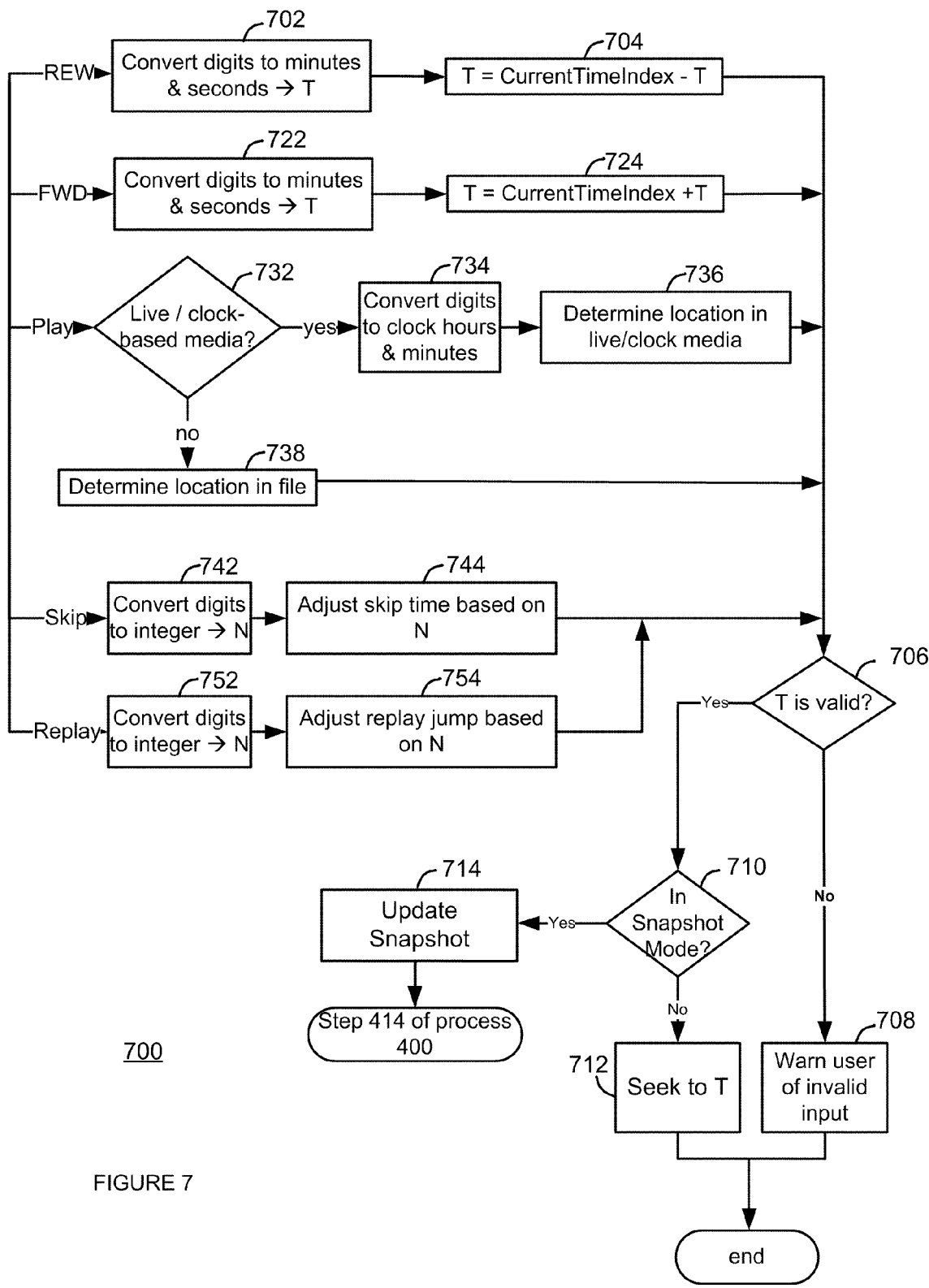
FIG. 7 is a flowchart of steps of one embodiment of details of temporarily altering the functionality of a transport key.

In step 608, the functionality of the transport key is temporarily modified based on the numeric value. Process 700 of FIG. 7 provides details of step 608. One example of a temporary modification is to interpret the numeric value as a time value and to modify the functionality of a fast forward key to jump forward that amount. Temporary modification means that the normal functionality of the transport key is returned at some point. The functionality can be returned the very next time the transport key is selected. In other words, the modification may last for a single selection of the transport key. However, temporary modification could last for a period of time in some cases.

In step 610, the video is presented on the display screen based on the temporary modification of the transport key. The following example that is based on the recorded video content being displayed in FIG. 1A will be used to illustrate a temporary modification of a transport key. The main display 107 is playing a recorded video file at the current location 1 hour and 53 minutes when the user selects the numbers "2" "4" and "9" followed by the play key. The numbers may be interpreted as a time 2:49 into the recorded file. Thus, the main display 107 is automatically switched to present at normal play the content at 2:49 into the recorded file. There are many other ways in which the numbers can be interpreted.

FIG. 7 is a flowchart of steps of one embodiment of a process 700 of temporarily altering the functionality of a transport key. Process 700 begins in the case in which step 606 of process 600 determined that a transport key was selected within the time period. Process 700 has numerous paths depending on which transport key was selected. Step 702 is performed when the transport key is the rewind key. A normal function of a rewind key may be to move backwards in the video (with or without displaying the video) as long as the user continues to select the rewind key. A temporary modification of the functionality of the rewind key may be to skip backwards an amount of time that is based on the numeric input. Thus, the user may not be required to continually press the rewind key.

In step 702, the numeric input (e.g., previously received in step 604 of process 600) is converted to a time value. In this example, the conversion is to minutes and seconds. For example, if the numeric input is "1" "3" "0", the conversion may be to 1 minute and 30 seconds. In step 704, a current time index is decremented by the time value. As an example, the current time index refers to an index that is associated with the video that is currently being played on the main display 107. If the current time index is 1:53:42 (hours:minutes:seconds), then the new time index is 1:52:12. In step 706, a determination is made whether the time index is valid. If not, then the user is warned (step 708).

If the time index is valid, then the action depends on whether the device is currently in snapshot mode (step 710). If not in snapshot mode, then a seek to the new time index is performed in step 712. The seek includes changing the main display 107 based on the new time index. For example, the main display 107 starts to play at normal speed the content at location 1:52:12 in the recorded file. Then, process 700 ends.

If the user is currently seeking with snapshots 125 enabled, then the snapshot 125 is updated based on the new time index in step 714. For example, if the snapshot 125 is currently at 4:33:00, and the user enters "1" "3" "0" and the rewind key, the snapshot 125 is nudged back to 4:31:30. Note that if there is not a snapshot 125 for the exact time of 4:31:30, a snapshot 125 for a nearby time may be displayed. Next, control of process 700 goes to step 414 of process 400 which is the starting of the settling clock. Referring back again to process 400 of FIG. 4, step 416 is a determination of whether any transport key was selected. In this embodiment, the selection could be the user selecting and holding the transport key or the user selecting a numeric value followed by a transport key (e.g., steps 604, 606 of process 600). If the user selects and holds the transport key, then control passes to step 404 to determine a new time index. If the user enters a numeric value followed by a transport key then control passes to process 700 to process according to which transport key was selected.

Referring again to process 700, processing of the fast forward (FWD) key will be discussed. A normal function of a fast forward key may be to move forward in the video (with or without displaying the video) as long as the user continues to select the fast forward key. A temporary modification of the functionality of the fast forward key may be to jump or skip ahead an amount of time that is based on the numeric input. Thus, the user may not be required to continually select the fast forward key. Processing of the fast forward key is similar to processing the rewind key, in this embodiment.

In step 722, the numeric value is converted to a time. In step 724, the current time index in incremented based on the calculated time. Processing of the fast forward key then proceeds to step 706, which has already been discussed.

Next, processing of the play key will be discussed. Normal functioning of the play key may include functionality including, but not limited to, resuming normal speed play of the video content at a location that is currently being displayed at a different speed. In some cases, the video might not be displayed, such as if the fast forward speed is so great that displaying the video would be impractical. The temporary modification to the play key may be to jump to a new location based on the numeric value that is input.

In step 732 a determination is made whether the video content is clock based (such as live video). In contrast, recorded video content may be considered to be have an absolute starting time of 0:00 corresponding to the beginning of the recorded file.

For clock based video, the numeric input is converted to a clock based time in step 734. For example, an input of "1" "2" "3" "0" may be converted to 12:30 pm. Thus, the input may be converted to an absolute time. Referring to the example in FIG. 1B, this may be interpreted as a request to jump to the location in the video buffer that corresponds to 12:30 pm. Note that clock based media may include recorded content. Processing then proceeds to step 706 and continues as with other transport keys.

For non-clock based video, the input numeric value is converted to hours and minutes from the start of the recorded file (step 738). For example, an input of "1" "3" "0" may be converted to 1 hours and 30 minutes into the recorded file. Referring to the example in FIG. 1A, this may be interpreted as a request to jump to the location 1 hour and 30 minutes into the recorded video file. Note that this type of skipping may apply to live media also. For example, referring to FIG. 1B, input of "2" "3" could be interpreted as a request to jump to the location 23 minutes from either the start of live TV or the start of live TV buffer. Processing then proceeds to step 706 and continues as with other transport keys.

Next, processing of the skip key will be discussed. The skip key may have a normal function of skipping forward a predetermined amount of time and starting normal speed play of the video from that point. The temporary modification of the skip key may be to temporarily adjust the predetermined amount of skip time. In step 742 the input numeric value is converted to an integer "N".

In step 744, the current time index is incremented based on the integer. As an example, the skip key has a predetermined skip time associated therewith (e.g., 30 seconds). The predetermined skip time is multiplied by the integer to arrive at a total skip time. The current time index is then adjusted by the total skip time. For example, if a user desires to skip through commercials of a television program for which they are familiar the user may know that there are always 3 minutes and 30 seconds of commercials during the first commercial break. The skip key may have a predetermined value of 30 seconds associated therewith (default skip time). By selecting 7 followed by the skip key all of the commercials are automatically skipped over.

In some embodiments, the skip key has a reaction time associated therewith. For example, instead of a 30 second skip in normal mode, the skip is actually 29 seconds to allow user reaction time of about 1 second. In this case, the modification for the above example may be to skip ahead 3 minutes and 29 seconds to allow for the same 1 second reaction time.

The temporary modification to the skip key is a rather elegant solution in that it does not require sophisticated algorithms to analyze the video content to attempt to determine what content is a commercial and what content is the program (e.g., by analyzing audio volume). However, the pattern of commercial breaks in many television programs may be remarkably static allowing the user to quickly learn exactly how far they need to skip ahead for a given commercial break. Note the different commercial breaks may have different intervals and that the user can in effect temporarily redefine the functionality of the skip key as desired. After the total skip time is determined processing proceeds to step 706.

Next, processing of the replay key will be discussed. The replay key may have a normal function of going backward a predetermined amount of time and replaying the video content from that point. The temporary modification of the replay key may be to temporarily adjust the predetermined amount of time. In step 752 the input numeric value is converted to an integer "N". In step 754, the amount by which the replay jumps back is adjusted based on N. For example, if the replay normally goes back 30 seconds, the replay might be adjusted to go back a multiple of or a fraction of 30 seconds, based on N. As with the skip key, there may be compensations for reaction time.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

In one embodiment, to control playback, the electronic device 214 executes computer readable instructions that are stored on computer readable media. The electronic device 214 has a processor on which the instructions are executed. For example, at least some of the steps of process 300, 400, 500, 600 and/or 700 may be implemented instructions that are stored on computer readable media executed on a processor. Computer readable media can be any available media that can be accessed by the electronic device 214. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the electronic device 214.

While some embodiments are implemented by executing computer readable instructions that are stored on computer readable media, this is not a requirement in all embodiments. Some embodiments may be implemented in hardware or a combination of hardware and software. For example, at least some of the steps of process 300, 400, 500, 600 and/or 700 may be implemented within an ASIC. As a particular example, a portion of the client 214 may be implemented with an ASIC.

Figure 8:
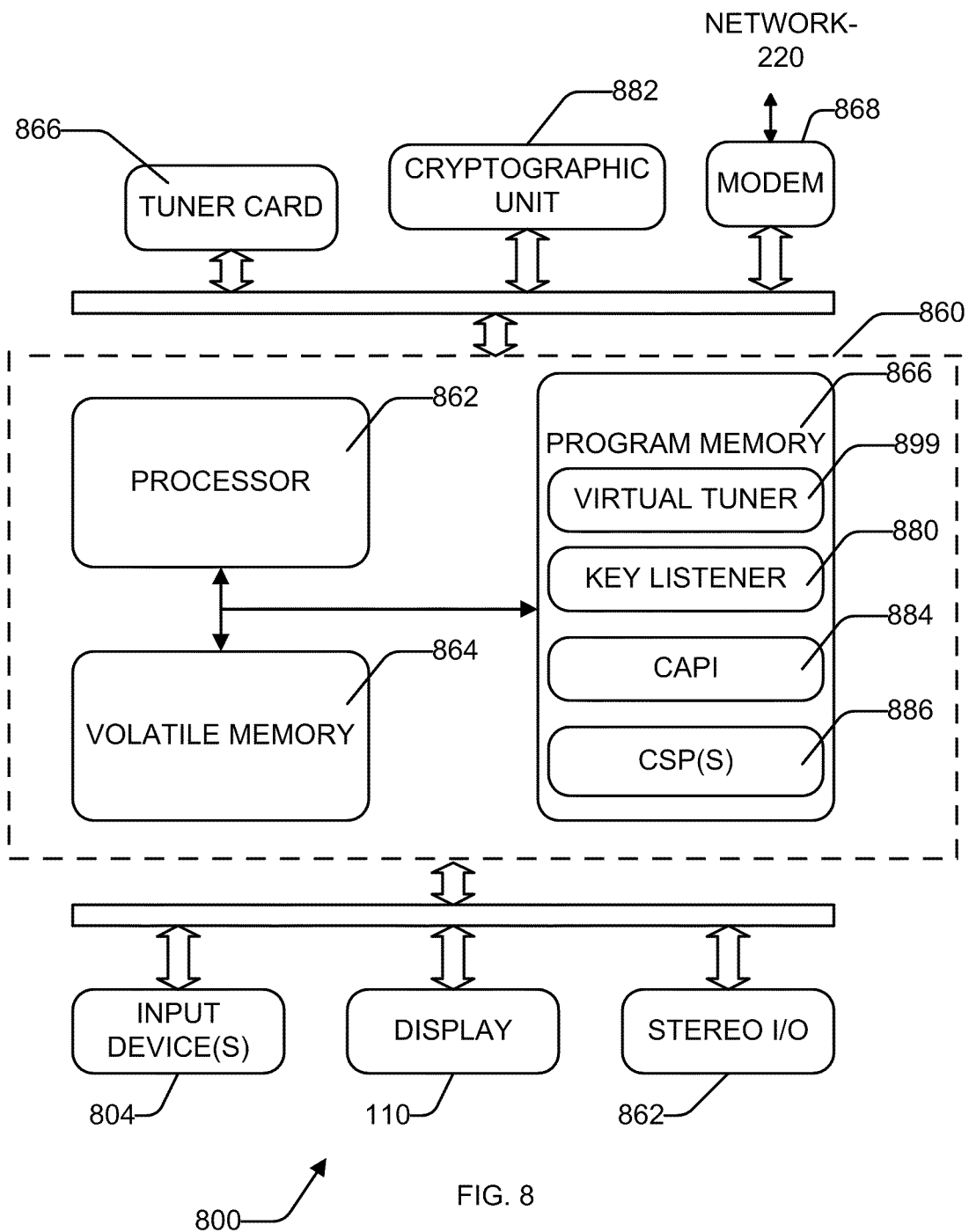
FIG. 8 shows an example configuration of a broadcast-enabled computer that serves as a platform for some embodiments of the present invention.

At least some of the embodiments disclosed herein may be implemented on electronic device 214(4). FIG. 8 shows an example configuration of a broadcast-enabled electronic media device 800 that may serve to implement at least a portion of the electronic device 214(4). Device 800 includes a central processing unit 860 having a processor 862, volatile memory 864 (e.g., RAM), and program memory 866 (e.g., ROM, Flash, disk drive, floppy disk drive, CD-ROM, etc.). The device 800 has one or more input devices 804 (e.g., keyboard, mouse, etc.), a video display 110 (e.g., VGA, SVGA), and a stereo I/O 872 for interfacing with a stereo system.

The device 800 has one or more tuners that tune to appropriate addresses on network 220 or frequencies not on the network 220. As previously discussed, the tuner can be a tuner card 876 coupled to the cable 117, antenna 124, or satellite dish 115. Alternatively, the tuner is a "virtual tuner" 899 implemented in software that allows access to content server 104(4) through modem 868. The tuner card 876 may be configured to receive either analog or digital data. For example, the tuner card 876 can receive MPEG-encoded digital video and audio data, as well as data in many different forms, including software programs and programming information in the form of data files. The device 800 also has a modem 868, which provides dial-up access to the data network 220 to provide a back channel or direct link to the server 104(4). In other implementations of a back channel, the modem 868 might be replaced by a network card, or an RF receiver, or other type of port/receiver that provides access to the back channel.

The device 800 runs an operating system that supports multiple applications. The operating system may be a multitasking operating system that allows simultaneous execution of multiple applications. The operating system may employ a graphical user interface windowing environment that presents the applications or documents in specially delineated areas of the display screen called "windows."

The device is illustrated with a key listener 880 to receive authorization and session keys transmitted from the servers 104(4), if necessary. The keys received by listener 880 are used by cryptographic security services implemented to enable decryption of the session keys and data. Cryptographic services are implemented through a combination of hardware and software. A secure, tamper-resistant hardware unit 882 is provided external to the CPU 860 and two software layers 884, 886 executing on the processor 862 are used to facilitate access to the resources on the cryptographic hardware 882.

The software layers include a cryptographic application program interface (CAPI) 884 that provides functionality to any application seeking cryptographic services (e.g., encryption, decryption, signing, or verification). One or more cryptographic service providers (CSPs) 886 implement the functionality presented by the CAPI to the application. The CAPI layer 884 selects the appropriate CSP for performing the requested cryptographic function. The CSPs 886 perform various cryptographic functions such as encryption key management, encryption/decryption services, hashing routines, digital signing, and authentication tasks in conjunction with the cryptographic unit 882. A different CSP might be configured to handle specific functions, such as encryption, decryption, signing, etc., although a single CSP can be implemented to handle them all. The CSPs 866 can be implemented as dynamic linked libraries (DLLs) that are loaded on demand by the CAPI, and which can then be called by an application through the CAPI 984.

Figure 9:
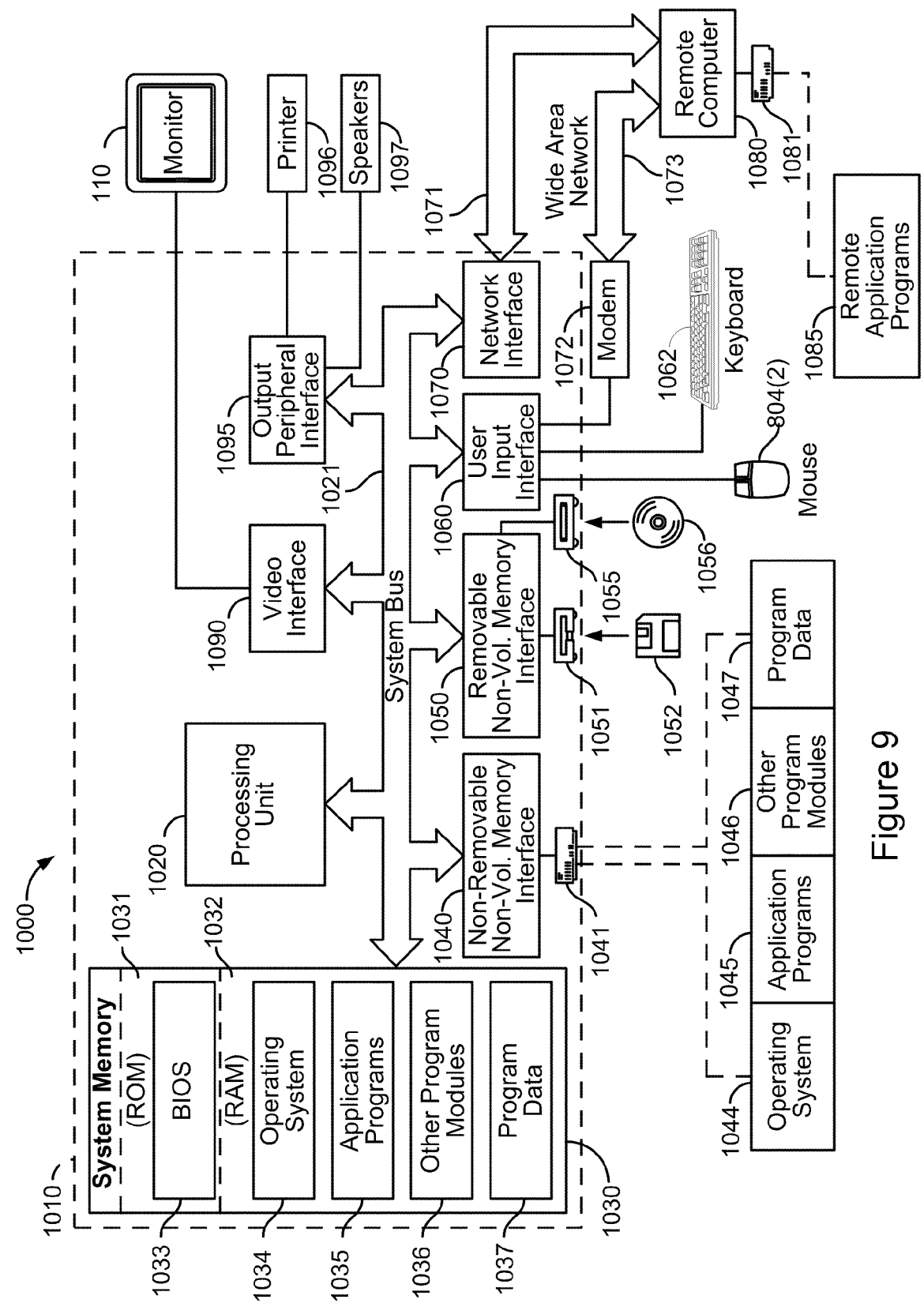
FIG. 9 is a block diagram for an embodiment of a computing environment for implementing the present technology.

FIG. 9 is a block diagram for an embodiment of a computing environment for implementing the present technology. In some embodiments, the computing environment of FIG. 9 may be used to implement electronic device 214 of the system of FIG. 2.

Computing environment 1000 of FIG. 9 is only one example of a suitable computing environment and is not intended to suggest any limitation as to the scope of use or functionality of the technology herein. Neither should the computing environment 1000 be interpreted as having any dependency or requirement relating to any one or combination of components illustrated in the exemplary operating environment 1000.

With reference to FIG. 9, an exemplary system for implementing the technology herein includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 9 illustrates operating system 1034, application programs 1035, other program modules 1036, and program data 1037.

The computer 1010 may also include other removable/non-removable, volatile/nonvolatile computer storage media. By way of example only, FIG. 9 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 9, provide storage of computer readable instructions, data structures, program modules and other data for the computer 1010. In FIG. 9, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 100 through input devices such as a keyboard 1062 and pointing device 804(2), commonly referred to as a mouse, trackball or touch pad. Other input devices (not shown) may include a microphone, joystick, game pad, satellite dish, scanner, remote control, or the like. These and other input devices are often connected to the processing unit 1020 through a user input interface 1060 that is coupled to the system bus, but may be connected by other interface and bus structures, such as a parallel port, game port or a universal serial bus (USB). A monitor 110 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 9. The logical connections depicted in FIG. 9 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer readable storage device having stored thereon a set of instructions which, when executed on a processor, cause the processor to:
   play audio-video content in a main display portion on a display screen of an electronic device at normal speed, the playing is associated with a current location in the audio-video content;
   receive an input through a user interface that a transport play key has been selected, the input indicates a seek location in the audio-video content;
   calculate a time index or a frame index in the audio-video content based on the selection of the transport key, the time index or the frame index is for the seek location;
   present a snapshot associated with the time index or the frame index in the audio-video content while continuing to play the audio-video content at normal speed at the current location, the snapshot includes a frame of image data of the audio-video content associated with the seek location;
   calculate new time indexes or new frame indexes so long as the transport play key continues to be selected and present additional snapshots associated with the new time indexes or the new frame indexes until the transport play key is no longer selected;
   start a settling clock when the transport play key is no longer selected, the settling clock having a settling time period;
   fine tune the seek location in response to receiving fine tuning input during the settling time period, including nudge the presently displayed snapshot a small amount in a direction specified by the fine tuning input;
   upon expiration of the settling clock either: 1) automatically display the content associated with the present snapshot in the main display, 2) issue a prompt requesting whether the content associated with the present snapshot should be switched to the main display portion of the display, or 3) abort presenting snapshots;
   determine that playing the audio-video content should be switched from the current location to the seek location associated with the present time index or the present frame index;
   switch the playing of the audio-video content from the current location to the seek location in the audio-video content in response to determining that playing the audio-video content should be switched; and
   discontinue presenting the snapshot associated with the seek location in response to switching the playing of the audio-video content from the current location to the seek location in the audio-video content.

2. The computer readable storage device of claim 1, wherein the instructions that cause the processer to present a snapshot associated with the seek location in the audio-video content while continuing to play the audio-video content at normal speed at the current location cause the processor to continue to present audio information associated with the audio-video content.

3. The computer readable storage device of claim 1, wherein the instructions that cause the processer to receive an input through a user interface that a transport play key has been selected and to calculate a time index or a frame index in the audio-video content based on the selection of the transport key cause the processor to:
   receive first input through the user interface that specifies a numeric value; and
   temporarily modify functionality of the transport key based on the numeric value.

4. The computer readable storage device of claim 3, wherein the instructions that cause the processer to modify the functionality of the transport key based on the numeric value cause the processor to:
   determine a time index based on the numeric value; and
   increment or decrement the current location in the audio-video content based on the time index.

5. The computer readable storage device of claim 4, wherein the instructions that cause the processor to modify the functionality of the transport key based on the numeric value cause the processor to:
   determine a time index based on the numeric value; and
   change the current location in the audio-video content to be the time index.

6. The computer readable storage device of claim 1, wherein upon expiration of the settling clock the processor automatically displays the content associated with the present snapshot in the main display portion of the display.

7. The computer readable storage device of claim 1, wherein the instructions which, when executed on a processor, cause the processor to:
   present a timeline on the display screen pertaining to the audio/video content;
   provide an interface in the display screen having an element to enter a snapshot mode in which the snapshots are presented and a number of transport keys, moves a marker along the timeline in response to a selection of one of the transport keys when in the snapshot mode, control the presentation of the audio-video content in the main region on the display screen in response to selection of the transport keys when not in the snapshot mode.

8. The computer readable storage device of claim 7, wherein the instructions which, when executed on a processor, cause the processor to:
   provide an interface in the display screen having a first fine tuning selection for nudging the snapshot forward and a first fine tuning selecting for nudging the snapshot backwards.

9. An electronic device that includes:
   a display screen; and
   a processor coupled to the display screen, the processor:
   presents audio-video content in a main region on the display screen at normal speed, the presentation of the audio-video content at normal speed is associated with a current location in the audio-video content, including playing audio content associated with the current location in synchronization with video content associated with the current location at normal speed;
   presents on the display screen a timeline pertaining to the audio/video content;
   receives a request through a user interface to present snapshots of images of other locations of the audio-video content while continuing to present the audio-video content at the current location at normal speed, the snapshots are reduced sized static images relative to the presentation of the current location, each snapshot is an individual video frame of the audio-video content;
   receives input that a marker is being moved along the timeline;
   determines seek locations in the audio-video content in response to the marker being moved along the timeline;
   provides snapshots associated with the seek locations on the display screen while continuing to present the audio-video content associated with the current location on the display screen, including continuing to play the audio content associated with the current location in synchronization with the video content associated with the current location at normal speed;
   starts a settling clock upon determining that the marker is no longer being moved along the timeline, the settling clock having a time period;
   fine tunes the present seek location in response to receiving fine tuning input during the time period, including nudge the presently displayed snapshot a small amount in a direction specified by the fine tuning input;
   determines whether any of the following occurs during the time period: 1) a request to move the marker along the timeline, 2) a request to abort presenting snapshots, or 3) a request to present the content at the present seek location in the main region of the display screen; and, if none of the foregoing occurs during the time period, then either: 1) automatically display the content associated with the present snapshot in the main region of the display, 2) issue a prompt requesting whether the content associated with the present snapshot should be switched to the main display, or 3) abort presenting snapshots.

10. The electronic device of claim 9, wherein upon expiration of the settling clock the processor automatically displays the content associated with the present snapshot in the main region of the display.

11. A method comprising:
   playing audio-video content in a main display portion on a display screen of an electronic device at normal speed, the playing is associated with a current location in the audio-video content;
   receiving an input through a user interface that a transport play key has been selected, the input indicates a seek location in the audio-video content;
   calculating a time index or a frame index in the audio-video content based on the selection of the transport key, the time index or the frame index is for the seek location;
   presenting a snapshot associated with the time index or the frame index in the audio-video content while continuing to play the audio-video content at normal speed at the current location, the snapshot includes a frame of image data of the audio-video content associated with the seek location;
   calculating new time indexes or new frame indexes so long as the transport play key continues to be selected and presenting additional snapshots associated with the new time indexes or the new frame indexes until the transport play key is no longer selected;
   starting a settling clock when the transport play key is no longer selected, the settling clock having a settling time period;
   fine tuning the seek location in response to receiving fine tuning input during the settling time period, including nudging the presently displayed snapshot a small amount in a direction specified by the fine tuning input;
   upon expiration of the settling clock either: 1) automatically displaying the content associated with the present snapshot in the main display, 2) issuing a prompt requesting whether the content associated with the present snapshot should be switched to the main display portion of the display, or 3) aborting presenting snapshots;
   determining that playing the audio-video content should be switched from the current location to the seek location associated with the present time index or the present frame index;
   switching the playing of the audio-video content from the current location to the seek location in the audio-video content in response to determining that playing the audio-video content should be switched; and
   discontinuing presenting the snapshot associated with the seek location in response to switching the playing of the audio-video content from the current location to the seek location in the audio-video content.

* * * * *